United States Patent
Wagle

[15] 3,656,864
[45] Apr. 18, 1972

[54] TURBOMACHINE ROTOR

[72] Inventor: Joseph A. Wagle, Indianapolis, Ind.

[73] Assignee: General Motors Corporation, Detroit, Mich.

[22] Filed: Nov. 9, 1970

[21] Appl. No.: 87,769

[52] U.S. Cl................................416/190, 416/193, 416/217, 416/198
[51] Int. Cl..........................................................F01d 5/30
[58] Field of Search..................416/190, 191, 193, 215, 217, 416/198 A, 500, 134

[56] References Cited

UNITED STATES PATENTS 3,532,438  10/1970  Palfreyman et al.................416/217 X
3,554,667  1/1971  Wagle....................................416/217

*Primary Examiner*—Everette A. Powell, Jr.
*Attorney*—Paul Fitzpatrick and Jean L. Carpenter

[57] ABSTRACT

A rotor for a compressor or turbine of the axial-flow type in which the rotor wheels or drum sections have blade stalks integral with them and the blades, including blade platforms, are mounted on the stalks by circumferentially extending dovetail structure. A spacer ring between adjacent rotor wheels includes fingers extending under the blade platforms which may hold the blades in place on the stalks and which may bear vibration damping material in contact with the blade platforms. A ring of such blades engaging in dovetails in plural axially aligned drum sections may hold these assembled together.

7 Claims, 5 Drawing Figures

PATENTED APR 18 1972 3,656,864

INVENTOR.
Joseph A. Wagle
BY
Paul Fitzpatrick
ATTORNEY

TURBOMACHINE ROTOR

The invention herein described was made in the course of work under a contract or subcontract thereunder with the Department of Defense.

DESCRIPTION

My invention is directed to rotor structures such as are used in axial-flow compressors and turbines; it has particular relation to the arrangement for mounting blades on the rim of the rotor, and also relates to arrangements for damping vibration of blades and to an arrangement for coupling successive sections of a rotor rim together by the blades which are mounted to the rim portions.

It has been common practice in turbomachines to mount blades on a rotor rim by a dovetail connection, either a dovetail extending generally axially of the rotor or one extending circumferentially. It is also known to space the gas-directing portion of the blade from the rim of the rotor by providing a stalk between the gas-directing portion and the root of the blade which is attached to the rotor by a dovetail.

A rotor embodying my invention differs from rotor structures of which I am aware in that the stalk is integral with the rotor rim rather than with the blade and in that the blade is coupled to the stalk through circumferentially extending dovetail root arrangements.

My invention also involves improved structure for preventing movement of the blades out of the mounting slots and blade vibration damping structure particularly suited to this type of rotor structure. My invention further involves a concept of coupling together adjoining portions of a rotor rim by the interlocking with these portions of the roots on a single row of blades.

The principal objects of my invention are to provide a rotor structure which is relatively feasible to manufacture and assemble and to provide a rotor structure which is best capable of withstanding the vibration and other loads encountered in service.

The nature of my invention and its advantages will be clear to those skilled in the art from the succeeding detailed description and accompanying drawings of preferred embodiments of the invention.

Figure 1:
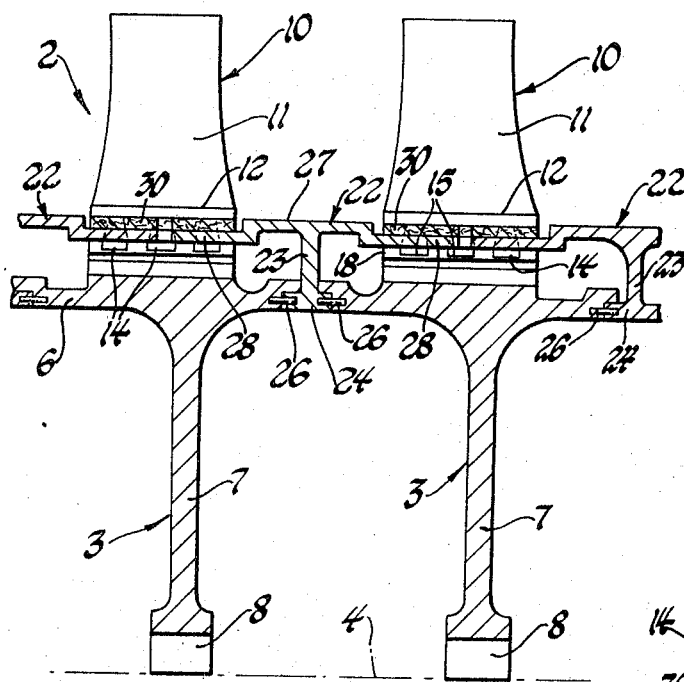
FIG. 1 is a partial sectional view of a turbomachine rotor taken on a plane containing the axis of revolution thereof, as indicated by the line 1—1 in FIG. 3.

Referring first to FIG. 1, a rotor structure for a turbomachine such as a compressor or turbine is illustrated. In further description of this and other figures, the rotor will be referred to as a turbine rotor, but the term is not intended to be one of exclusion, since similar structures may be employed in compressors.

Figure 3:
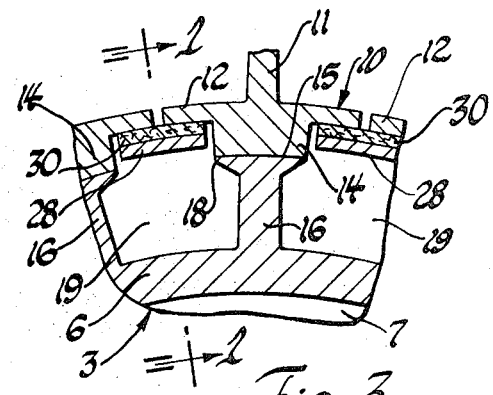
FIG. 3 is a transverse sectional view taken on a plane as indicated by the line 3—3 in FIG. 2.

The turbine rotor 2 comprises a number of wheels 3 of which two are illustrated, these wheels being fixed together in any suitable known way for rotation about an axis 4. Each wheel includes a rim 6, a web 7, and a hub 8. The web and hub may be omitted in the case of a drum type rotor, in which case the rim 6 becomes a section or annular element of the rotor. The wheel or rim may be referred to as a blade support. Referring also to FIG. 3, each wheel 3 bears a ring of blades 10, each blade comprising an airfoil or gas flow directing portion 11 and a platform 12 defined by flanges extending laterally from the airfoil at its base.

Each blade also includes a root portion defined by a number of dovetail root elements 14, there being three such root elements on each blade in the structure illustrated in FIG. 1. The root elements 14 are received in dovetail or undercut slots 15 extending circumferentially of the wheel 3 across the outer end of blade stalks 16 integral with the wheel rim 6 and projecting radially from it. The stalks 16 have heads 18 enlarged laterally through which the slots 15 are cut. The wheel 3 may be a cast or machined structure. If it is machined, the original rim is turned to provide the slots 15 and then the spaces 19 between the stalks 16 may be formed by broaching or milling.

Figure 2:
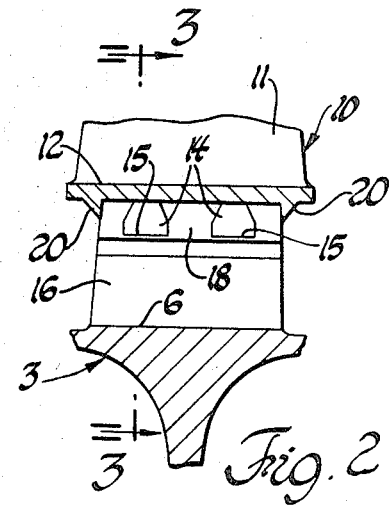
FIG. 2 is a view of a portion of a rotor illustrating a different form of the invention.

The wheel rim structure of FIG. 2 is essentially the same as that of FIG. 1 except for a difference in the blade support, and corresponding parts are given the same numbers in FIG. 2 as in FIG. 1. In this structure, however, the blade has only two root elements 14 and there are but two blade slots 15. Also, in this form, the blade includes flanges 20 providing abutments bearing against the forward and rearward faces of the stalk.

The distance between adjacent stalk heads 18 is slightly greater than the width of the stalk heads. The ring of blades 10 may be held in a fixture and mounted onto the wheel by moving the wheel axially into alignment with the blades with the blades disposed between the platforms, then rotating the wheel one-half the angle between adjacent blades so as to center the blade roots 14 in the slots 15. Preferably, the ends of the blade root elements are coplanar with the side faces of the stalk head. Various means, such as a pin extending transversely to the slots 15 and bearing in a hole in the stalk and in grooves in the undersurface of the blade root elements, may be employed to retain the blades in place. Likewise, pins extending circumferentially of the rotor and having heads at each face of the blade root may be employed. It is also possible to fill the space 19 between the stalks and under the blade platforms with any substance which may be readily removed and which may preferably have a blade damping function. However, I prefer to employ the blade retaining means illustrated particularly in FIGS. 1 and 3.

Interstage spacer rings 22 are disposed between the wheel 3 in abutting relation to the rims of the wheels. As shown in FIG. 1, the interstage spacer is of a roughly T-shaped configuration with a web 23 extending radially from a flange 24 at the inner margin. The flange 24 underlies the marginal portions of the wheel rims and is piloted into the wheel rims to align the spacer with the wheel rims and the wheel rims with each other. Transmission of torque between adjacent wheels is accomplished at any suitable way as, for example, by circumferentially spaced pins 26 extending axially of the rotor and inserted in mating holes in the wheel rims and spacer rings.

Each spacer ring 22 includes a peripheral portion 27 aligned with the blade platforms 12 of the adjacent blade rows. The spacer ring may cooperate with sealing means on a stator blade ring (not illustrated). Fingers 28 extend forwardly and rearwardly from the peripheral portion 27 into the spaces between the adjacent blade roots 14 and between adjacent stalk heads 18. These are in close proximity to these parts (the clearance being exaggerated in FIG. 3) so that no significant movement of the blade root circumferentially in the slot is possible.

A pad 30 of a friction material which may be slightly compressible and, depending upon the environment, may be a relatively high temperature resisting material such as an asbestos composition, is fixed to the outer surface of each finger 28 in position to rub against the undersurfaces of the platforms 12. Thus, if there is vibration in the blade, the resulting minute sliding movement of the parts 12 over the pad 30 will damp it. The webs 23 provide a barrier to flow of gas from stage to stage below the platforms 12.

Figure 4:
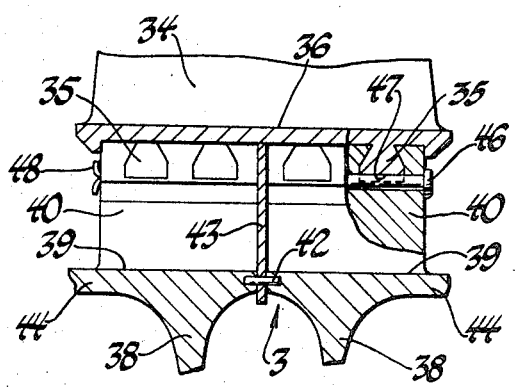
FIG. 4 is a view similar to FIG. 1 of a further embodiment of the invention.

FIG. 4 illustrates a different embodiment of the invention in which much of the structure is similar to that previously described, but here blocking of flow under the platforms is accomplished in a different manner, and the row of blades serves as means to couple together two adjacent sections of the rotor. In FIG. 4, each blade 34 includes four dovetail root elements 35 and a platform 36. The rotor as illustrated in FIG. 4 includes two rotor members 38, each having a rim portion 39 and stalks 40 which may be of the cross section illustrated in FIG. 3 extending from the two members. The stalks 40 of each member are aligned with those of the other. The rotor members are coupled for joint rotation and translation of torque by pins 42 received in circular bores in the faces of the rotor members. Sealing against leakage of gas under the platforms is accomplished by a seal ring 43, a full annular or segmented ring impinged between the adjoining faces of the rims and stalks which abuts the undersides of the blade platforms 36. The extension of the rim portion as indicated at 44 may serve as an interstage spacer and may extend to a second annular row of blade stalks 40.

FIG. 4 illustrates a different mode of retention of the blade roots in the stalks. A headed pin 46 extends through an axial bore in the aligned blade stalks and is received in notches 47 extending axially of the rotor in the bottoms of the root elements 35. The split forward end of the pin is spread as indicated at 48 to retain it. The pins 46 may be relied upon to transmit torque between the rotor members; if so, the pins 42 may be omitted.

Figure 5:
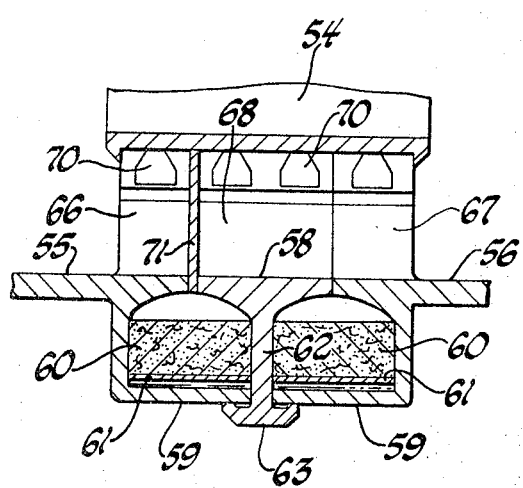
FIG. 5 is a view similar to FIG. 1 of a still further embodiment of the invention.

FIG. 5 shows still another form of rotor structure embodying similar principles to those previously described but also including a fiber-composite reinforcement. FIG. 5 may be a section of a drum-type rotor with reinforcing rings as disclosed in my prior application Ser. No. 823,608 filed May 12, 1969, of common ownership. A row of blades 54 is mounted on three rotor members; a forward rotor member 55, a rear rotor member 56, and a center rotor member 58. These are annular bodies defining together the rim or other surface of a rotor, preferably one of the drum type. The rings 55 and 56 have interior axially extending marginal portions 59 about which are disposed two fiber composite reinforcing rings 60 and corrugated standoff rings 61 as described in my prior application noted above. The margins of the portions 59 bear against a web 62 of the center member 58, and an inner marginal flange 63 on the web bears against the inner surface of portions 59 so that the ring 58 is supported against centrifugal force by the reinforcing ring 60. This is similar to structure described in my prior application Ser. No. 34,055 filed May 4, 1970, of common ownership.

Stalks to which the blades 54 are connected are defined by stalk portions 66, 67, and 68 extending from the members 55, 56, and 58, respectively. These may have the cross section illustrated in FIG. 3, and the blades are similarly mounted in them. In this case, the blade as illustrated has four root elements 70 with the forward and rearward root elements engaged in suitably configured dovetail slots in the platform portions 66 and 67 and the two intermediate ones similarly engaged in the platform portions 68. A seal ring 71 similar to the ring 43 is provided to prevent leakage under the platforms. The successive rotor members may be coupled together for torque transmission by pins, splines, or any other suitable means, including that shown in Ser. No. 34,055.

Spacer members such as the spacer 22 illustrated in FIG. 1 may be provided in the structures of FIGS. 4 and 5, if desired, and may, of course, include the damping arrangement 28, 30 previously described.

In the structures of FIGS. 4 and 5, the blades are assembled in a suitable fixture and the portions of the rotor are abutted together, moved into place, and rotated to align the blade roots in the slots in the stalks. The blades thereafter hold the sections of the rotor assembled.

It should be apparent to those skilled in the art from the foregoing description that the principles of the invention lead to rotor structures which are simple, readily fabricated, and readily assembled, and which are particularly well suited to use in compressors and turbines for gas turbine engines and other purposes.

The detailed description of preferred embodiments of the invention for the purpose of explaining the principles thereof is not to be considered as limiting or restricting the invention, since many modifications may be made by the exercise of skill in the art without departing from the scope of the invention.

I claim:

1. A turbomachine rotor comprising, in combination, a rotatable blade support having an annular rim and having blade stalks integral with the rim projecting radially outward from the rim and extending in the direction across the rim, the blade stalks being mutually spaced at their radially outer ends, the stalks having plural dovetail blade slots extending circumferentially of the rim in the outer ends of the stalks; a blade mounted on each stalk, each blade having plural dovetail root elements engaged in the slots to retain the blade in the directions axially and radially of the rotor; and means cooperating with the support and blades restraining the blades circumferentially of the rotor.

2. A turbomachine rotor stage comprising, in combination, a rotatable blade support having an annular rim and having blade stalks integral with the rim projecting radially outward from the rim and extending in the direction across the rim, the blade stalks being mutually spaced at their radially outer ends, the stalks having plural dovetail blade slots extending circumferentially of the rim in the outer ends of the stalks; a blade mounted on each stalk, each blade having plural dovetail root elements engaged in the slots to retain the blade in the directions axially and radially of the rotor; and blade vibration damping means disposed between the stalks abutting the root elements restraining the blades circumferentially of the rotor.

3. A turbomachine rotor comprising, in combination, a rotatable blade support having an annular rim; blade stalks extending radially from the rim and a blade extending radially from each stalk; the blades including laterally projecting platforms extending from the radially inner end of the blades to provide an annular inner boundary of the motive fluid path through the blades; a tongue and groove connection extending circumferentially of the rotor between each blade and a stalk including root elements on the blade; a spacer ring fixed to one face of the rim including a peripheral portion extending around the rotor adjacent to the platforms, the spacer ring bearing fingers extending between the stalks and under the platforms engaging the platforms to damp vibration of the blades and engaging the root elements to retain the blades in place circumferentially.

4. A turbomachine rotor comprising, in combination, a rotatable blade support having an annular rim and having blade stalks integral with the rim projecting radially outward from the rim and extending in the direction across the rim, the blade stalks being mutually spaced at their radially outer ends, the stalks having plural dovetail blade slots extending circumferentially of the rim in the outer ends of the stalks; a blade mounted on each stalk, each blade having plural dovetail root elements engaged in the slots to retain the blade in the directions axially and radially of the rotor, the blades including laterally projecting platforms extending from the radially inner end of the blades to provide an annular inner boundary of the motive fluid path through the blades; a spacer ring fixed to one face of the rim including a peripheral portion extending around the rotor adjacent to the platforms, the spacer ring bearing fingers extending between the stalks and under the platforms, the fingers engaging the platforms to damp vibration of the blades.

5. A turbomachine rotor comprising, in combination, a rotatable blade support having an annular rim and having blade stalks integral with the rim projecting radially outward from the rim and extending in the direction across the rim, the blade stalks being mutually spaced at their radially outer ends, the stalks having plural dovetail blade slots extending circumferentially of the rim in the outer ends of the stalks; a blade mounted on each stalk, each blade having plural dovetail root elements engaged in the slots to retain the blade in the directions axially and radially of the rotor, the blades including laterally projecting platforms extending from the radially inner end of the blades to provide an annular inner boundary of the motive fluid path through the blades; a spacer ring fixed to one face of the rim including a radial web blocking flow under the platforms and a peripheral portion extending around the rotor adjacent to the platforms, the spacer ring bearing fingers extending between the stalks and under the platforms; and yieldable friction material disposed between and engaging the fingers and platforms to damp vibration of the blades.

6. A turbomachine rotor comprising, in combination, a rotatable blade support comprising two coaxial members each having an annular rim and having blade stalks integral with the rim projecting radially outward from the rim and extending in the direction across the rim, the blade stalks on the two members being aligned, the blade stalks being mutually circumferentially spaced at their radially outer ends, the stalks on both members having plural dovetail blade slots extending circumferentially of the rim in the outer ends of the stalks; a blade mounted on each aligned pair of stalks, each blade having plural dovetail root elements engaged in the slots of the stalks of both members to retain the blade in the directions axially and radially of the rotor; and means cooperating with the support and blades restraining the blades circumferentially of the rotor.

7. A turbomachine rotor comprising, in combination, a rotatable blade support comprising two coaxial members each having an annular rim and having blade stalks integral with the rim projecting radially outward from the rim and extending in the direction across the rim, the blade stalks on the two members being aligned, the blade stalks being mutually circumferentially spaced at their radially outer ends, the stalks on both members having plural dovetail blade slots extending circumferentially of the rim in the outer ends of the stalks; a blade mounted on each aligned pair of stalks, each blade having plural dovetail root elements engaged in the slots of the stalks of both members to retain the blade in the directions axially and radially of the rotor and to fix the coaxial members together; and means cooperating with the support and blades restraining the blades circumferentially of the rotor.

* * * * *